RADIO BEACON

Original Filed March 2, 1944 5 Sheets-Sheet 1

INVENTOR
REED R. BRUNNER, DECEASED,
BY MARY M. BRUNNER
ADMINISTRATRIX
BY Joseph Th. Hoppell
Rhode Hovey
ATTORNEYS

RADIO BEACON

Original Filed March 2, 1944 5 Sheets-Sheet 2

INVENTOR
REED R. BRUNNER, DECEASED
BY, MARY M. BRUNNER
ADMINISTRATRIX
BY Joseph Th. Hoizell and Blade Koontz
ATTORNEYS

RADIO BEACON

Original Filed March 2, 1944 5 Sheets-Sheet 3

INVENTOR
REED R. BRUNNER, DECEASED,
BY, MARY M. BRUNNER
ADMINISTRATRIX
BY Joseph W. Hazell and Wade Hoover
ATTORNEYS

RADIO BEACON

Original Filed March 2, 1944 5 Sheets-Sheet 4

INVENTOR
REED R. BRUNNER, DECEASED,
BY MARY M. BRUNNER
ADMINISTRATRIX
BY Joseph W. Hazell and Wade Hoover
ATTORNEYS

RADIO BEACON

Original Filed March 2, 1944 5 Sheets-Sheet 5

INVENTOR
REED R. BRUNNER, DECEASED,
BY MARY M. BRUNNER
ADMINISTRATRIX
BY Joseph W. Hazell and Clade Koontz
ATTORNEYS Reissued Nov. 23, 1948 Re. 23,050

UNITED STATES PATENT OFFICE 23,050

RADIO BEACON

Reed R. Brunner, deceased, late of Baltimore, Md., by Seismograph Service Corporation, Tulsa, Okla., a corporation of Delaware, assignee Original No. 2,417,807, dated March 25, 1947, Serial No. 524,722, March 2, 1944. Application for reissue February 25, 1948, Serial No. 10,822

15 Claims. (Cl. 343—105)

(Original granted under the act of March 3, 1883, as amended April 30, 1928; 370 O. G. 757)

The invention described herein may be manufactured and used by or for the Government of the United States or for governmental purposes only without the payment of any royalty thereon.

This invention relates to radio beacons and more particularly to radio beacons affording a number of optional approach paths which may be selected by the operator of the guided vehicle.

There are available at the present time three general forms of radio bacon for guiding airborne vehicles on predetermined paths in space. In one of these forms, there are present a plurality of directive radiation lobes, either modulated or keyed with interlocking signals, and on-course indications are secured in the plane which is the locus of all points of equal intensity of the adjacent lobes. In this type of beacon, the number of approach paths is determined by the original design of the beacon installation, and varies in the systems so far disclosed from two to twelve, with the four course beacon at present the most common. The course definition is about plus or minus two miles laterally at one hundred miles.

In a second form of contemporary beacon, there is employed a rotating directive lobe of radiant energy, with some means for indicating the passage of the radiation maximum through a predetermined direction. The signal at the mobile vehicle is then applied to some form of phase indicating apparatus to perform the bearing finding operation. Here again, accuracy is of the order of plus or minus one degree giving a lateral course definition of plus or minus two miles at a radial distance of one hundred miles. With this beacon, the bearing from the beacon may be determined, whatever the location of the vehicle with respect thereto, and it is frequently referred to as the omnidirectional beacon.

Of late there has been described a beacon in which frequency modulated energy is applied to a pair of spaced radiators, and since the relative time displacement of the two energies arriving at a mobile vehicle in the fields of said radiators is a function of its angular position with respect to a line passing through the radiators, beat frequencies are derived in apparatus carried on the vehicle which are indicative of the bearing of the vehicle from the beacon location. This apparatus does not provide useful indications on a line which is the perpendicular bisector of the line defined by the radiators, because in this region the beat frequencies become small with respect to the frequency at which the radiated energy is swept back and forth over the selected portion of the frequency spectrum, and satisfactory operation is obtained only when two or more cycles at the beat frequency occur during carrier excursion in any one direction. Further, at each reversal of the frequency sweep there is disturbance of the input to the indicating instruments, and at some angles, complete cancellation of the energy between the positive and negative sweeps occurs. Here again, lateral course definition at a distance of one hundred miles is approximately plus or minus two miles.

One of the principal objects of this invention is to provide a new and novel radio beacon system having improved lateral course definition.

Another object of the invention is to provide an improved omnidirectional radio beacon.

Still another object of the invention is to provide a new and novel radio beacon system in which no directional radiators need be used.

Yet another object of the invention is to provide a radio beacon system with a stabilized field pattern.

The above objects and advantages are accomplished by individually impressing alternating current energy of different frequencies on a pair of spaced radiators and simultaneously radiating energy controlled by the difference between said frequencies. The radiated energies are intercepted at the mobile vehicle, and a stimulus derived from the first mentioned energies is employed to actuate one element of a phase indicator, while a stimulus derived from the last mentioned energy is impressed on the other element thereof. The phase meter serves to indicate the angular direction to the vehicle from a reference line through the radiating system.

Other objects and advantages of the invention will in part be disclosed and in part be obvious when the following specification is read in conjunction with the drawings in which Figure 1 is a block diagram illustrating the essential features of the invention.

Figure 2 is a diagram illustrating the method of computing the difference in path length with the mobile vehicle remote from the beacon location.

Figures 3, 4, and 5 are diagrams showing the loci of points at which the reference phase meter reading is obtained.

In the description of the structure and operation of the invention the adoption of a mathematical notation for the presentation is convenient.

A, B, C, G, H are coefficients defining the wave amplitude.
$\alpha$ is the antenna spacing from the median line therebetween.
$c$ is the free space velocity of light.
$d_1$, $d_2$ are the respective distances from the radiating antennae to the receiver location.
M is the modulation factor.
$n$ is an integer expressing the harmonic order.
$s$ is the physical lateral deviation of the receiver from the reference position.
$t$ represents time.
$\lambda$ represents free space wavelength.
$\omega=2\pi$ times the carrier frequency.
$\Omega=2\pi$ times the modulation frequency.
$\omega'=2\pi$ times a second carrier frequency, differing from the first carrier frequency.
$\phi$ is the phase meter indication.
$\theta$ is the azimuthal bearing angle of the receiver from the transmitter.

Figure 1:
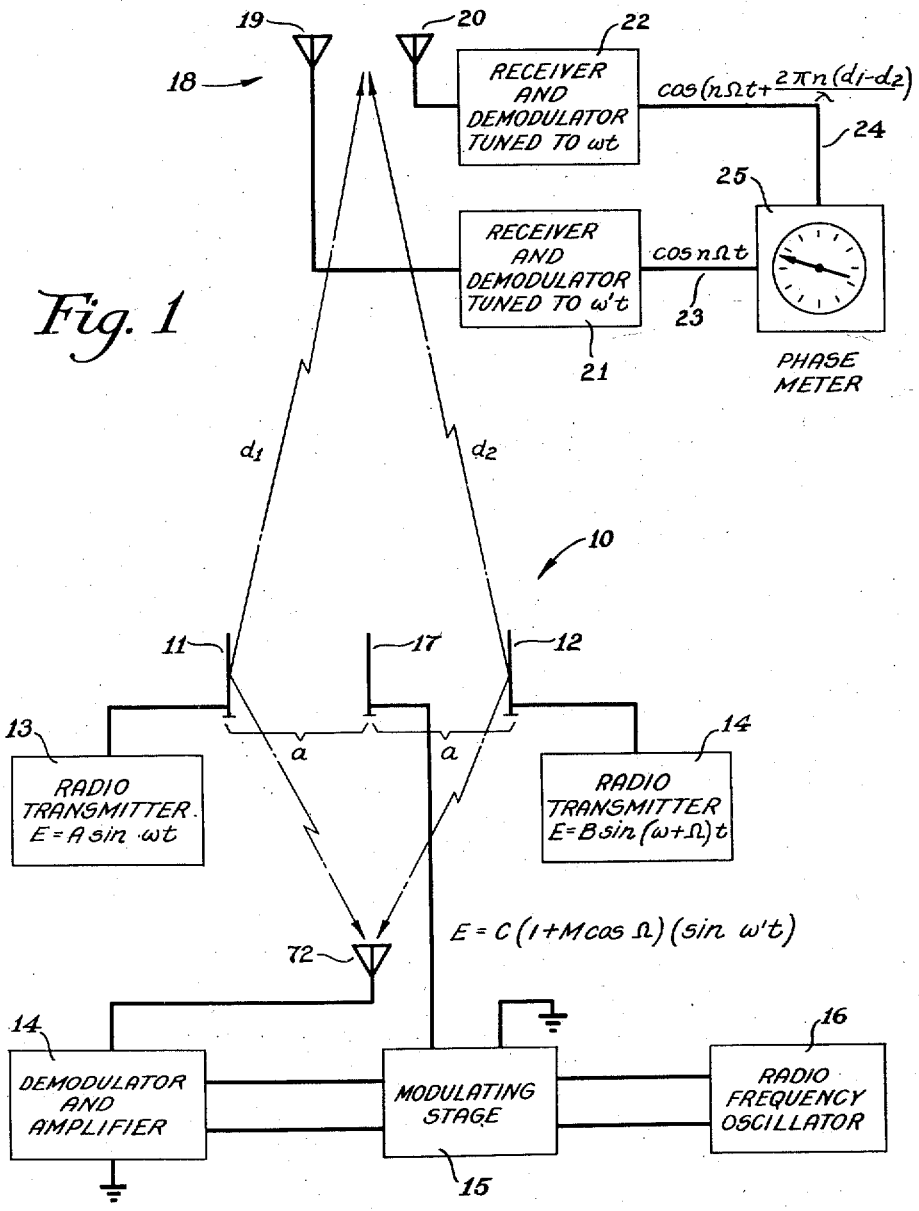

Referring now to Figure 1, the beacon transmitting apparatus indicated generally at 10 includes antennas 11 and 12 spaced by a distance $2\alpha$. The radio transmitter 13 having an output voltage $E=A \sin \omega t$ is connected to and energizes radiator 11, and radio transmitter 14 having an output voltage $E=B \sin (\omega+\Omega)t$ is connected to and energizes radiator 12. Located in the common radiation field of antennas 11 and 12 is the antenna 72 connected to a demodulator and amplifier 73, of any suitable type, having the output thereof impressed on the modulating stage 15. The modulating stage 15 also receives energy from the radio frequency oscillator 16 and the co-action of the output from oscillator 16 and demodulator and amplifier 73 in modulator stage 15 produces an output voltage $E=C(1+M \cos \Omega t)(\sin \omega' t)$ which output is impressed on an antenna 17 which may be centrally disposed between antennas 11 and 12. As is apparent from the equations, stage 15 produces amplitude modulation at a frequency equal to the difference between the frequencies of transmitters 13 and 14 but if desired the energy impressed on antenna 17 could as well be frequency modulated. The function of the apparatus connected to the central antenna 17 is merely to radiate reference energy at a frequency $\Omega$ and this function is equally well fulfilled by the employment of phase, amplitude, or frequency modulation, or other known systems for producing in a remotely located radio receiver energy at a frequency $\Omega$. The mobile vehicle whose angular bearing is to be determined is located at 18 and includes antennas 19 and 20 connected to the receivers 21 and 22 tuned respectively to $\omega'$ and $\omega$. The resulting output in the lead 23 from receiver 21 has the form cosine $n\Omega t$ and the output in lead 24 from receiver 22 has the form cosine $$\left(n\Omega t+\frac{2\pi n(d_1-d_2)}{\lambda}\right)$$

These outputs are separately impressed on the elements of the indicating phase meter 25. In the expression for the output in lead 24, $d_1$ and $d_2$ correspond to the indicated distances in Figure 1 between antenna 11 and the receiving location 18, and antenna 12 and the receiving location 18 respectively.

Inspection of the expressions for the voltage in leads 24 and 23 shows that the phasemeter indication will be constant so long as the vehicle carrying the receiver moves in a manner maintaining the quantity $(d_1-d_2)$ constant, as the factors $n$ and $\lambda$ are constants determined by the design of the installation. "$n$" refers to the harmonic order of the modulating energy affecting the radiation from antenna 17, and $$\lambda=\frac{2\pi c}{\omega}$$

where $c$ is the velocity of propagation of electromagnetic waves. As the curves of constant phase meter indication are the loci of constant difference in the length of radii to two foci, it is clear that their plane projections have the form of hyperbolas. When this system is used for the guidance of airborne craft, it is found that the loci of points of constant phase meter indication are the surfaces of hyperboloids of revolution. In the balance of this presentation, consideration will be limited to the case in which separation of the vehicle from the beacon system exceeds ten times the spacing of antennas 11 and 12 and the effect of departure from the ground plane under these antennas is negligible. For these conditions, the approximations of Figure 2 suffice for the determination of the phase relations between the two alternating currents applied to the phase meter 25.

Figure 2:
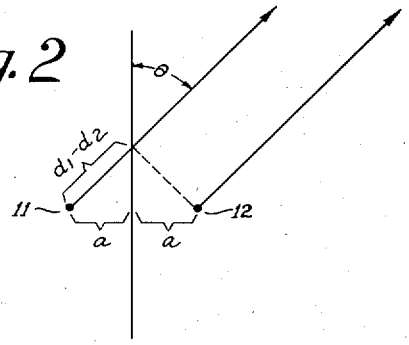

In considering the operation of the apparatus of Figure 1, with $n=1$, let it be assumed that the mobile vehicle is remote from the beacon and that it is displaced to the right of the perpendicular bisector of the line defined by the antennas 11 and 12. The distance $d_1$ is therefore greater than $d_2$ and the approximations of Figure 2 are valid. Energy arriving at 18 from antenna 11 requires a certain time for transmission, and the resulting voltage may be represented by $$e_1-G \sin \omega\left(t-\frac{d_1}{c}\right)$$

The energy from antenna 12 requires a lesser time for transmission and arrives with a voltage $$e_2=H \sin (\omega+\Omega)\left(t-\frac{d_2}{c}\right)$$

Upon combination and demodulation of these signals in the receiver 22, whose pass band is sufficient to accept signals in the frequency range $\omega$ to $\omega+\Omega$, there is obtained, among others, an alternating current wave of the form $$\cos\left(\omega t+\Omega t-\frac{\omega d_2}{c}-\frac{\Omega d_2}{c}-\omega t+\frac{\omega d_1}{c}\right)$$

which is, in simplified form $$\cos\left[\Omega t+\frac{\omega}{c}(d_1-d_2)-\frac{\Omega d_2}{c}\right]$$

These forms result from the combination of the two signals in accordance with the cosine law and the derivation of the envelope equation for the voltage wave produced. They correspond to the voltage wave on lead 24.

Antenna 72 is shown located on the perpendicular bisector of the line joining antennas 11 and 12, thereby making $(d_1-d_2)=\phi$ at this point. As will be shown later, in practice the error introduced by the term $$\frac{\Omega d_2}{c}$$

does not amount to more than 0.1 degree and may be neglected. The envelope of the output from modulating stage 15 therefore has the equation $M \cos \Omega t$ at the antenna 17 and arrives at the receiving location 18 with the form cos $$\left(\Omega t - \frac{\Omega d}{c}\right)$$

Here $d$ has a value intermediate $d_1$ and $d_2$ and may be represented as $d_2 \pm \delta$. The form given is that of the voltage wave on lead 23.

The angle indicated by the phase meter 25, which may be of any well known type, is the difference in phase between the input from receivers 21 and 22, $$\phi = \frac{\omega}{c}(d_1 - d_2 - \frac{\Omega d_2}{c} + \frac{\Omega d_2}{c} \pm \frac{\Omega \delta}{c}$$

$$\phi \frac{\omega}{c}(d - d_2), \text{ very nearly}$$

Elimination of the last term is permissible, since $\Omega$ will usually correspond to a frequency of 1000 c. p. s., and $\delta$ cannot exceed "$a$" in Figures 1 or 2. If $a$ be taken as 100 meters, evaluation of the term $$\frac{\Omega \delta}{c}$$

shows it to have a maximum value of 0.002 radians or 0.1 degree, which as above noted, need not be considered.

From Figure 2, $(d_1 - d_2) = 2a \sin \theta$. Assuming that the frequency of the currents applied to the phasemeter 25 is multiplied by "$n$," the final expression for the phase meter indication is $$\phi = \frac{2\pi n}{\lambda} \cdot 2a \sin \theta$$

radians, or $$\frac{360 n . 2a \sin \theta}{\lambda}$$

degrees. Confining attention to the course definition in the immediate vicinity of the perpendicular bisector of the line joining the antennas 11 and 12, and calling the distance from the base of this line to the vehicle $d$, $\sin \theta$ may be taken as $$\frac{s}{d}$$

where $s$ represents the lateral deviation from the reference course line. Then, letting $a = 5\lambda$ and $n = 1$ $$\phi = \frac{2\pi - 10\lambda}{\lambda} \frac{s}{d}$$

$$\phi = \frac{20\pi s}{d}$$

Taking $0.01\pi$ radians, or 1.8 degrees as an easily discernible phase meter reading, the corresponding course definition is:

$$s = \frac{\phi}{20\pi} d = 0.0005 d$$

Therefore, if $d$ be 100 miles, $s = 264$ feet, far surpassing the locating accuracy of any contemporary system. Employing a multiplication factor $n = 3$, as was done in an operative installation, the definition was narrowed to plus or minus 88 feet at 100 miles.

Figure 3:
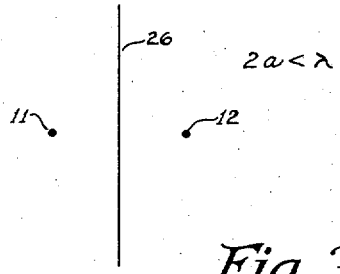
Figure 4:
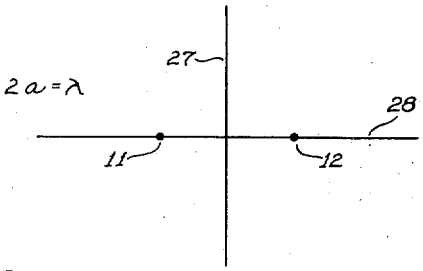
Figure 5:
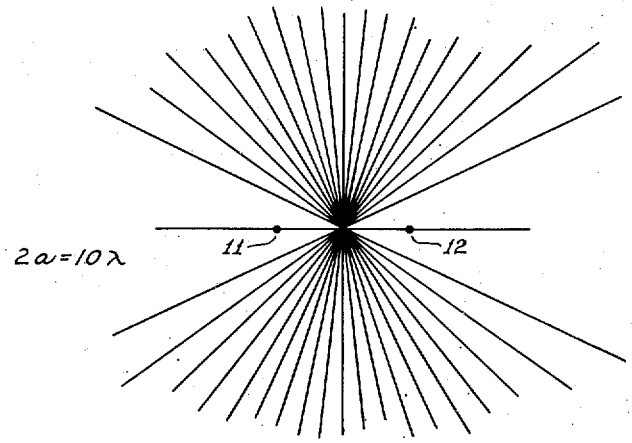

Reconsidering the expression for the phase meter reading, it is seen that, when $a = 5\lambda$ and $n = 1$, $\phi$ may have any value between 0 and $20\pi$ radians. Unless special precautions are taken, the 0, $2\pi$, $4\pi$, etc., indications are indistinguishable from one another and will appear as a zero indication. As shown in Figure 3, there is but a single path 26 along which phase meter zero indications are obtained when the spacing of antennas 11 and 12 is less than a full wavelength. Figure 4 shows the two course lines 27, 28 along which zero phase meter indications are secured with an antenna spacing of one wavelength, and Figure 5 shows the twenty course lines along which zero phase meter indications are secured with an antenna spacing of ten wavelengths. The invention is most conveniently practiced in the very high frequency portion of the radio spectrum since, for example, an antenna spacing of ten wavelengths with a radiated frequency of 100 megacycles per second is 30 meters or about 100 feet.

The positional ambiguities resulting from the employment of a system having the characteristics of Figure 5 to secure great accuracy may be resolved by the use of a system having the characteristics of Figure 4 with the fundamental frequencies impressed on a first phase meter, and at the same time multiplying the frequencies at the receiver and impressing the energy thus derived on a second phase meter to provide sensitive indications. Then, when the sensitive phase meter shows a zero indication, it may be readily determined by consulting the fundamentally excited phase meter whether the craft is on the zero order, first order, second order, etc., course line of constant phase meter reading.

A disadvantage of the system of Figure 1 is the fact that two carrier frequencies are employed. The system of Figure 6 makes more efficient use of the available spectrum space. Here, the radio frequency oscillator 29 having the frequency $\omega$ energizes the antenna 11 through the modulator 30. The antenna 12, spaced from antenna 11 by the distance $2a$ is energized from the radio transmitter 31 having the output frequency $\omega + \Omega$, and the antenna 72 is excited from the common fields of the two antenna systems. Voltages from the antenna 72 are impressed on the demodulator 32, whose output is passed through the filter 33 tuned to the difference frequency between the alternating current energies supplied to antennas 11 and 12. The output from filter 33 is then fed to the frequency multiplier 34 whose output controls the emanations from antenna 11 through the modulator 30. Passage of the energy from filter 33 through the multiplier 34 increases the frequency thereof by the factor "$n$." Upon intercepting and demodulating the signal received at the mobile vehicle from the radiating system described above, there are obtained in the demodulator output at the vehicle a current of the form cos $n\,\Omega$, whose phase is independent of the bearing of the vehicle from the beacon, and a current of the form cos $$\left(\Omega t + \frac{2\pi(d_1 - d_2)}{\lambda}\right)$$

The two currents are separated by filters at the receiver, and the first is applied directly to one of the operating windings of a phase meter, while the other is passed through a multiplier corresponding to multiplier 34 and then impressed on the other operating winding of the phase meter. The indications obtained are substantially the same as those secured with the system of Figure 1 and the operation of the apparatus is fundamentally the same. A detailed description of apparatus suitable for use in the arrangement of Figure 6 will now be given.

Figure 7:
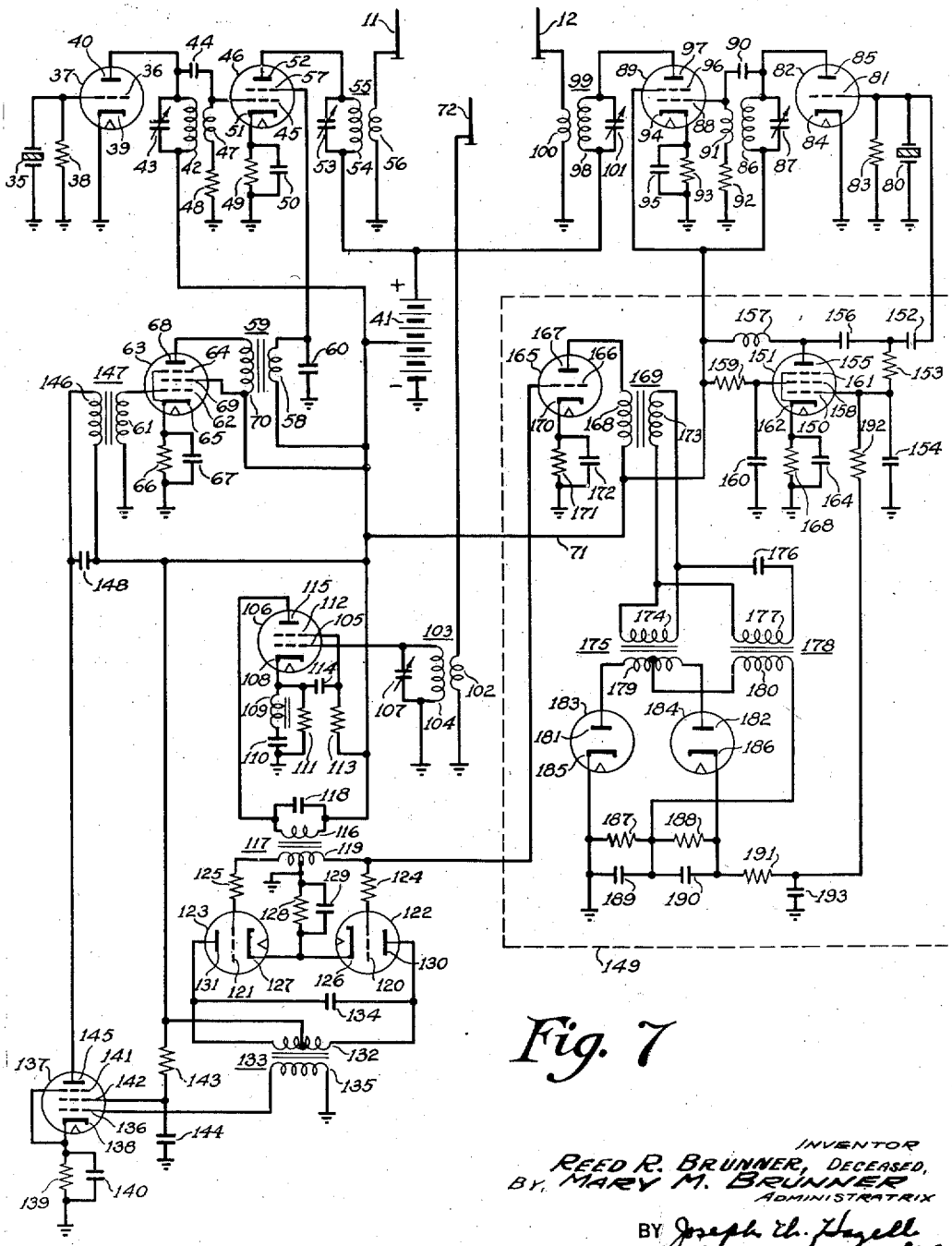
Figure 7 is a detailed schematic diagram of transmitting apparatus for exciting the beacon antenna system.

The equipment presented in Figure 7 includes all the apparatus situated at the beacon location. In this and the remaining figure, heater circuits for the vacuum tubes are merely indicated as the final configuration thereof may be varied at will by the designer. Antennas 11, 12 and 72 are stationary and are associated with each other in the spacial relationship indicated in the previous figures. The position of antenna 72 may be made adjustable if it is desired to control the position of the course lines of zero phase meter indication. The piezo-electric crystal 35 is connected between the control grid 36 of the vacuum tube 37 and ground in shunt with a resistor 38. The cathode 39 of the tube 37 is directly connected to ground, and the anode 40 receives energy from a positive tap on the anode source 41 through the parallel circuit of inductance 42 and capacitance 43. With the resonance frequency of the circuit 42, 43 set slightly above the resonance frequency of the crystal 35, oscillations are set up at a frequency controlled by the constants of the crystal 35 and its holder, and the oscillation energy is applied to the control grid 45 of the power amplifier tube 46 through the coupling capacitor 44. A choke 47 and grid leak resistor 48 are connected between the grid 45 and ground to provide a part of the operating bias, the balance of which is secured from the voltage drop across the resistor 49 connected between the cathode 51 and ground in shunt with the bypass capacitor 50. The anode 52 of power amplifier 46 is energized from the high voltage positive terminal of anode source 41 through the parallel resonant circuit formed by the capacitor 53 and the primary 54 of the output coupling transformer 55 having the secondary 56 connected between the radiating antenna 11 and ground. The space charge grid 57 of amplifier 46 is fed from the positive tap of anode source 41 through the secondary winding 58 of the modulation transformer 59 and is grounded for radio frequency currents by the capacitor 60.

A second piezo-electric crystal 80 differing in frequency from crystal 35 by an amount represented by Ω in the previous portions of the presentation is connected between the control grid 81 of the oscillator tube 82 and ground in shunt with a grid leak resistor 83. The cathode 84 of the tube 82 is connected directly to ground, and thus to the negative terminal of the anode source 41 which is also grounded, and the anode 85 is excited from the positive tap on source 41 through the inductance 86 shunted by adjustable capacitor 87. As is well known, the adjustment of the circuit 86, 87 to a resonance frequency slightly above the crystal resonance induces oscillations in the circuit at a frequency controlled by the resonance frequency of the crystal 80 and the shunt capacity across said crystal. The alternating current component of the voltage at anode 85 is impressed on the control grid 88 of the power amplifier tube 89 via the blocking capacitor 90, and the return for grid 88 is provided by the radio frequency choke 91 and grid resistor 92 connected in shunt therewith to ground. As before, bias for the control grid 88 is provided in part by the grid current flowing through resistor 92 and in part by the voltage drop across the resistor 93 connected between cathode 94 and ground in shunt with the bypass capacitor 95. Excitation for the space charge grid 96 is derived from the positive tap on source 41 and the anode 97 is connected to the high voltage positive terminal of said source 41 through the primary 98 of the output coupling transformer 99 whose secondary winding 100 is connected between antenna 12 and ground. Primary winding 98 is shunted by the adjustable capacitor 101, which is adjusted as customary, for minimum direct current in the output circuit of the vacuum tube 89.

The two oscillator and power amplifier combinations so far described afford means for energizing the antennas 11 and 12 at radio frequencies differing from one another by the amount Ω, and differ primarily in that position is made for the modulation of the energy derived from oscillator tube 37. The antenna 72 responds to the radiations at each of the frequencies, which are sufficiently closely spaced that a resonant circuit of ordinarily encountered Q is responsive to both. The voltages at antenna 72 are impressed on the primary winding 102 of the input transformer 103, and the secondary 104 thereof is connected to the control grid 105 of the biased detector tube 106 in shunt with the resonating capacitor 107. The cathode 108 of the tube 106 is connected to ground through the series circuit of inductance 109 and capacitance 110 resonant to alternating current of frequency Ω. A direct current path to ground from cathode 108 is provided by the bias resistor 111 connected therefrom to ground. The space charge grid 112 is connected to the intermediate tap on source 41 through the dropping resistor 113 and grounded for alternating current energy by the connection of bypass capacitor 114 from the grid 112 to the cathode 108.

The anode 115 of tube 106 is supplied from the intermediate voltage tap of the source 41 through the primary 116 of the transformer 117 and the primary 116 is shunted by the capacitor 118 having a value selected to resonate with the inductance 116 at the frequency Ω which is the difference frequency between the alternating currents in antennas 11 and 12. A filtered alternating voltage at frequency Ω appears across the secondary 119 of transformer 117 and is symmetrically impressed on the control grids 120, 121 of the frequency multiplier tubes 122, 123 through the current limiting resistors 124, 125. Operating bias for the control grids 120, 121 is provided by the connection of the cathodes 126 and 127 to ground through the biasing resistor 128 shunted by the capacitor 129. The values of the bias resistor 128 and the limiting resistors 124 and 125 are selected to provide a maximum of output at the third harmonic of the input frequency. The anodes 130, 131 of the frequency multiplier tubes are connected respectively to either end of the center tap primary winding 132 of the transformer 133 and the center tap thereof is connected to the intermediate voltage point on source 41. A capacitor 134 in shunt with primary 132 resonates the transformer at the third harmonic of the input frequency in secondary 119 which then appears in the secondary winding 135 connected between the control grid 136 of the amplifier tube 137 and ground. As in previous stages, operating bias for tube 137 is supplied by the connection of the cathode 138 to ground through the bias resistor 139 shunted by the bypass capacitor 140, and the suppressor grid 141 is also connected to the cathode 138 to provide pentode operation. Excitation for the space charge grid 142 is secured from the source 41 through the dropping resistor 143 whose grid end is connected to ground through a capacitor 144, and the anode 145 is connected to the same source through the primary 146 of the transformer 147 shunted by the capacitor 148 whose value is also selected to resonate this circuit at the third harmonic of the previously mentioned difference frequency. These third harmonic voltages then appear in the secondary 61 of the transformer 147 to be impressed on the control grid 62 of the modulator tube 63, which is a pentode having the suppressor grid 64 internally connected to the cathode 65 returned to ground through the bias resistor 66 and shunting capacitor 67. The anode 68 of this modulator tube 63 is connected to the space charge grid 69 through the primary winding 70 of the transformer 59 and this point is then returned to the intermediate positive terminal of the source 41.

The apparatus thus far delineated corresponds to that situated at the beacon location in Figure 6, and its operation is substantially as follows:

The oscillator 82 and power amplifier 89 are adjusted in the usual manner by setting the capacitor 87 to a value resonating the anode circuit of crystal oscillator 82 to a frequency somewhat higher than that of crystal 80 and adjusting the variable capacitor 101 in the anode circuit of tube 89 for minimum anode current. Antenna 12 is then excited with a voltage wave whose form may be taken as $\sin(\omega+\Omega)t$. With the receiver connected to antenna 72 temporarily de-energized, the oscillator 37 and power amplifier 46 are similarly adjusted and excite the antenna 11 with the voltage wave of the form $\sin \omega t$. However, the excitation for the space charge grid 57 in power amplifier 46 is subject to variation in accordance with potentials appearing in the secondary 58 of the modulation transformer 59, so that when the receiver connected to antenna 72 is energized, there appears in the anode circuit of the tube 105 energy at the difference frequency between the inputs to antennas 11 and 12, which is then multiplied in frequency in the tubes 122, 123 with the associated transformer 133 and filtered by the action of tube 137 in conjunction with the tuned transformer 147 to vary the energy input to antenna 11 at the third harmonic frequency of the difference between the frequencies impressed on antenna 72. As a result, the final form of the excitation for the antenna 11 is $(1+M \sin 3\Omega t) \sin \omega t$ where, M, as usual, is a constant indicating the percentage of modulation. In practice it is desirable to keep the ratio of carrier signal intensities from antennas 11 and 12 at four-to-one or greater and to limit the percentage of modulation to avoid the production of excessive harmonic content in the output of the demodulator 106.

Although the transmitting apparatus of Figure 7 modulates the carrier radiated from antenna 11 at a frequency which is three times the difference frequency between the alternating carrier currents in antennas 11 and 12, the apparatus as so far described incorporates no provision for maintaining this difference frequency constant. This function may be performed by the apparatus situated within the dashed enclosure 149 of Figure 7 in which the control grid 150 of the variable reactor tube 151 is connected to the ungrounded terminal of the crystal 80 through the blocking capacitor 152, the phase shifting resistor 153, and the phase shifting capacitor 154. The anode 155 of the reactor tube 151 is also connected to the crystal 80 through the capacitor 165 having negligible reactance at the operating radio frequency, and excited from the intermediate voltage tap on source 41 through the choke 157, while the space charge grid 158 is also connected to this point of the source 41 through the dropping resistor 159 grounded at the grid end by the capacitor 160. The reactor tube 151 may be of the pentode type having the suppressor grid 161 connected to the cathode 162 which is returned to ground through the biasing resistor 163 bypassed by capacitor 164. The control potentials for the reactor tube 151 are obtained from the output of the amplifier tube 165 whose control grid 166 is connected to one terminal of the secondary 119 of the transformer 117, and the anode 167 of which is connected to the anode supply bus 71 through the primary 168 of transformer 169. As is the custom, operating bias is provided by connecting the cathode 170 to ground through the resistor 171 and parallel capacitor 172.

The amplified currents in the secondary 173 of transformer 169 are passed through the divided circuit comprising the primary winding 174 of transformer 175 and the series combination of capacitor 176 and primary winding 177 of transformer 178. The current flowing in the winding 174 is substantially in quadrature with the voltage delivered by the secondary 173, and the value of capacitor 176 is selected to series resonate with the primary 177 at the intended difference frequency $\Omega$, causing the current in this branch of the circuit to be substantially in phase with the voltage from winding 173. As the exciting currents of the two transformers are in quadrature, so also are the output voltages from the center tapped secondary winding 179 of transformer 175 and secondary winding 180 of transformer 178 respectively, so long as the difference frequency remains at the intended value. Should the frequency deviate from the assigned value, this phase relation is upset, and the transformer windings are connected to a rectifier circuit responding to phase changes by a change in output voltage. This is done by connecting one terminal of the secondary winding 180 to the center tap of winding 179 whose extremities are connected to the anodes 181, 182 of the rectifier tubes 183, 184 having the cathodes 185 and 186 connected to either end of the series connected resistors 187 and 188. Each of these resistors 187, 188 is shunted by a bypass capacitor 189, 190, and the common terminal of the two resistors attached to the other end of the winding 180. The combination serves as a discriminator circuit in which equal and opposite polarities appear across the resistors 187 and 188 so long as the input frequency remains at the assigned value. In the event of change in frequency, the vector sum of the voltages in one branch of the rectifier circuit increases while the other decreases due to the change in the phase relations of the component vectors so that a net voltage is produced across the resistor combination whose sign is dependent on the direction of frequency deviation and whose magnitude is controlled by the amount of frequency deviation. This potential is employed as the control voltage for the variable reactor tube 151 by the grounding of cathode 185 and the connection of cathode 186 to the control grid 150 through the filter resistors 191 and 192, whose junction is connected to ground through the filter capacitor 193. A lagging current is drawn from the circuit including crystal 80 by the reactor tube 151 and this current opposes the effect of the crystal electrodes and other circuit capacitances. A positive voltage output from the circuit of the rectifiers 183, 184 increases the amount of lagging current drawn and effectively decreases the capacity shunting the crystal 80, thereby increasing the oscillating frequency. Since the normal operating frequency of crystal 88 is higher than that of cystal 35, this results in an increase in beat frequency, and as a result, the polarity of connection of transformers 175 and 178 is chosen to provide a positive discriminator output voltage should the impressed frequency fall below the assigned value. Consequently, the discriminator circuit and associated reactor tube act as a stabilizer returning the beat frequency between the outputs impressed on antennas 11 and 12 to its preassigned value should anything cause it to vary. Positive beat frequency deviations produce stabilization in the inverse of the manner just described. The complete combination of apparatus in Figure 7 radiates an unmodulated carrier from the antenna 12, and a modulated carrier at antenna 11 modulated at the third harmonic of the difference frequency between the carrier frequencies on the two antennas, the frequency of the carrier on antenna 12 being adjusted by the apparatus in the enclosure 149 to maintain a constant difference frequency.

Figure 6:
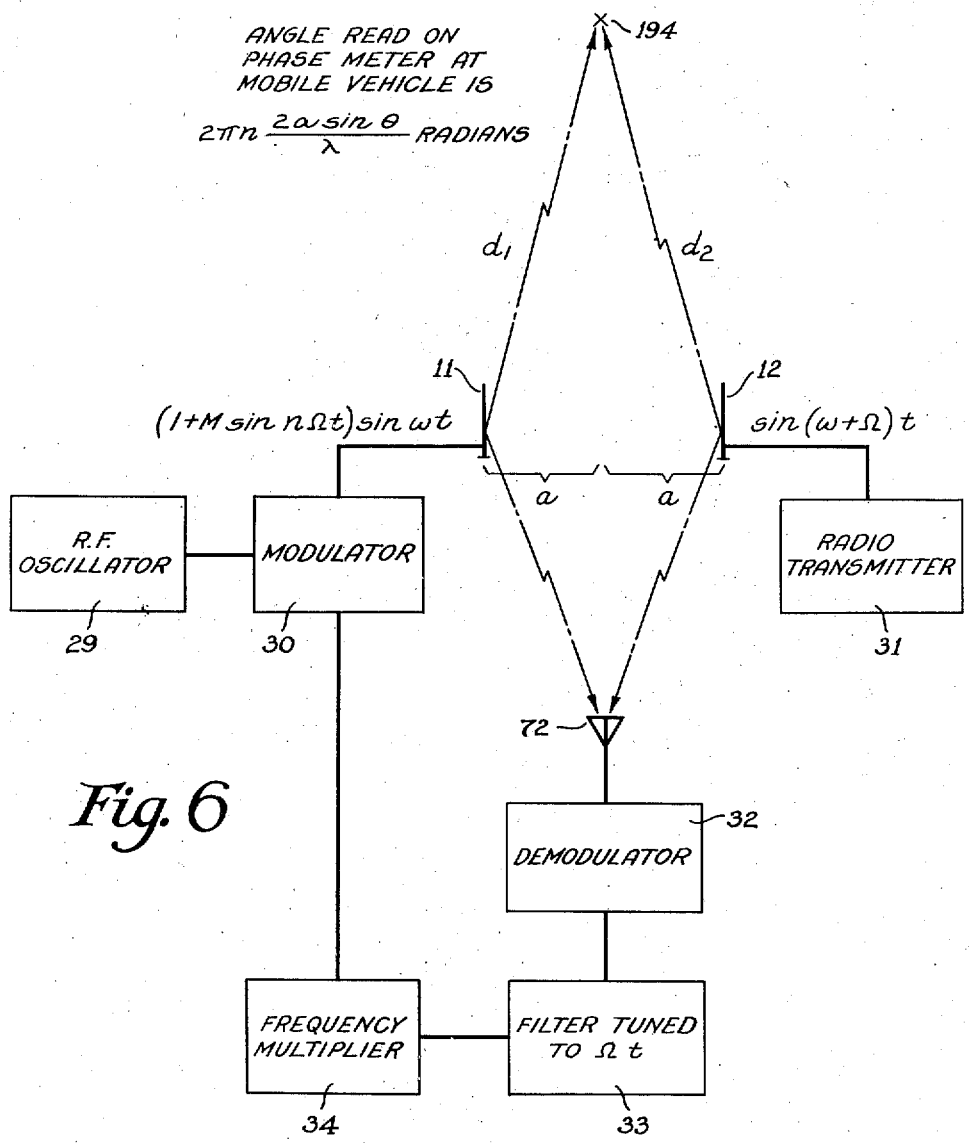
Figure 6 is a block diagram showing an alternative method of practicing the invention.
Figure 8:
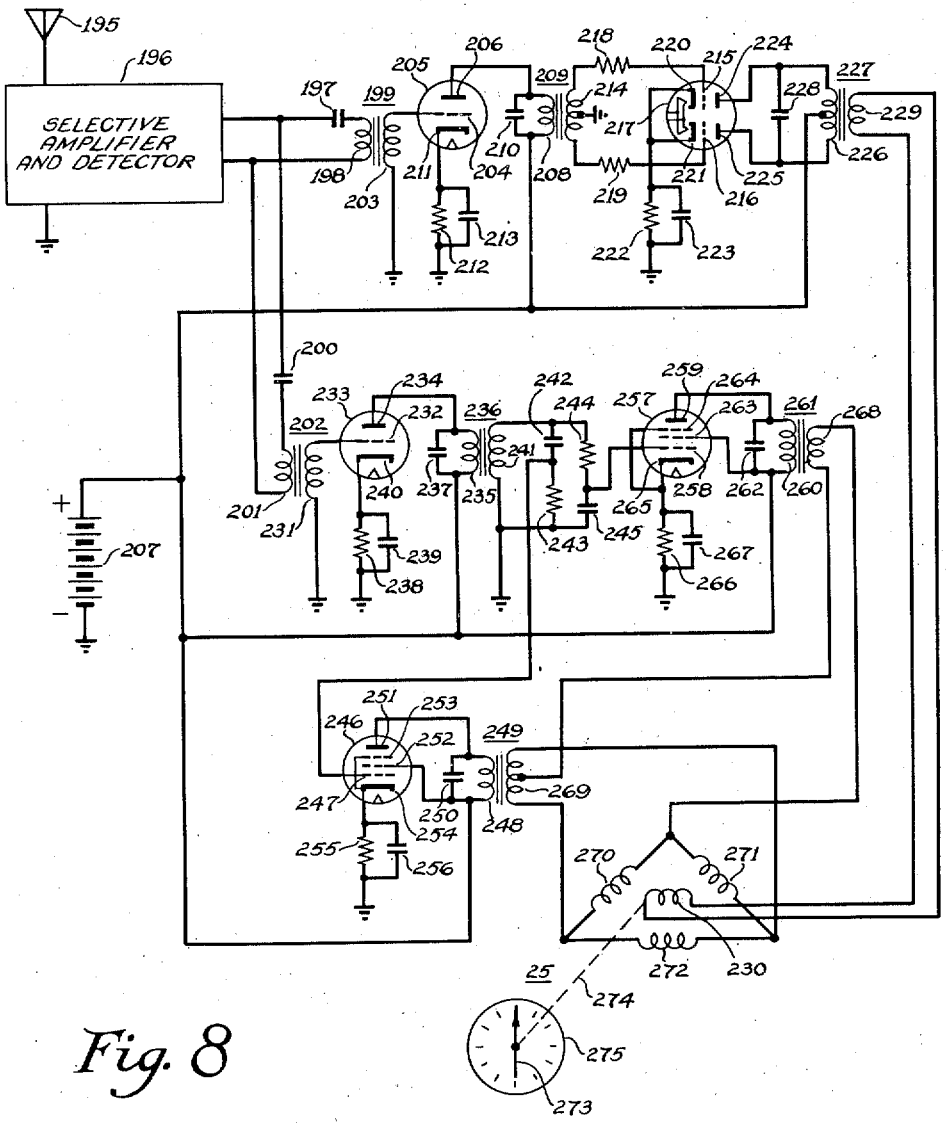
Figure 8 is a detailed schematic diagram of receiving apparatus for translating the received energy at the mobile vehicle into bearing indications.

The composite signal thus produced is received on the apparatus of Figure 8, which may be located as shown at 194 in Figure 6. The antenna 195 intercepts and delivers the composite signal to the selective amplifier and detector 196 in whose output there appear signals at the difference frequency due to the beat note between the two carriers and at the third harmonic of the difference frequency due to the detection of the amplitude modulation on the carrier from antenna 11. These signals are applied to the dividing networks including the capacitor 197 which is series resonant with the primary winding 198 of transformer 199 at the difference frequency, and the capacitor 200 which is series resonant with the primary winding 201 of transformer 202 at the third harmonic of the difference frequency.

The difference frequency output in the secondary 203 of transformer 199 is applied to the control grid 204 of the amplifier tube 205 having its anode 206 connected to the positive terminal of the anode source 207 through the transformer primary 208 of transformer 209 which is shunted by the capacitor 210 rendering the circuit resonant to the difference frequency. The direct current circuit for the excitation of the tube 205 is completed by the connection of the negative terminal of the anode source 207 to ground and the attachment of the cathode 211 to the same point through the resistor 212 and shunting capacitor 213, the latter combination serving to provide operating bias for the amplifier stage. The filtered difference frequency output appearing in the center tapped secondary winding 214 of transformer 209 is symmetrically applied to the control grids 215 and 216 of the dual amplifier tube 217 though the limiting resistors 218 and 219 respectively. The limiting action of the resistors 218 and 219, combined with high negative grid bias secured by the connection of the cathodes 220 and 221 to ground through a high resistance 222 and bypass capacitor 223, provides a large third harmonic component in the current flowing to the anodes 224 and 225 connected to the extremities of the center tapped primary winding 226 of the phase meter coupling transformer 227. The winding 226 is tuned by the capacitor 228 to resonance at the third harmonic of the normal beat frequency, and the center tap is connected to the positive terminal of the source 207 to energize the anode circuits of the tube 217. The secondary winding 229 delivers energy at the third harmonic of the beat frequency to the rotatable winding 230 of the phase meter 25 from the output circuit of the tube 217.

Energization for the remainder of the phase meter windings is obtained from the train of amplifiers receiving signal energy at the third harmonic of the difference or beat frequency from the secondary winding 231 of transformer 202. One terminal of the winding 231 is connected to ground and the other is attached to the control grid 232 of the amplifier 233 having the anode 234 thereof connected to the positive terminal of source 207 through the primary winding 235 of transformer 236, this winding being tuned to resonance at the third harmonic of the difference frequency by the shunting capacitor 237. As in the previous stages described, bias is secured by the connection of the resistor 238 in parallel with capacitor 239 between the cathode 240 and ground. The output from secondary winding 241 of the transformer 236 is then applied to a phase splitting circuit including a capacitor 242 and resistor 243 connected in series across the terminals thereof, and a second combination of resistor 244 and capacitor 245 connected in inverse order parallel therewith. By making the impedance of each of the four circuit elements equal, there are secured across resistor 243 and capacitor 245, respectively, alternating current voltages of equal magnitude which are in phase quadrature with each other. Each of these voltages is impressed on a separate amplifier and combined in the well known manner of the Scott transformer connection to provide three-phase excitation voltage for the fixed windings of the phase meter 25.

Amplifier 246 has its grid 247 connected to the junction of resistor 243 and capacitor 242 and its anode 251 connected to one end of the primary winding 248 of the coupling transformer 249 tuned to the third harmonic of the difference frequency by the shunting capacitor 250. The other end of the primary winding 248 is connected to the positive terminal of the source 207, together with the space charge grid 252 of amplifier 246, which is of the pentode type having a suppressor grid 253 internally connected to the cathode 254 attached to ground through the bias resistor 255 and bypass capacitor 256.

The amplifier 257 supplies the balance of the reference energy for the phase meter by the connection of the control grid 258 to the junction point between the resistor 244 and capacitor 245, providing an alternating current component passing from anode 259 through the primary winding 260 of transformer 261 and the source 207. The efficiency of this stage is increased by tuning the primary 260 to resonance at the third harmonic of the normal difference frequency with the parallel capacitor 262. The amplifier 257 is also a pentode having the space charge grid 263 connected to the positive terminal of source 207 and the suppressor grid 264 connected internally to the cathode 265 attached to ground by the parallel combination of resistance 266 and capacitor 267.

The secondary 268 of transformer 261 has induced therein a voltage which is in quadrature with that appearing in the center tapped secondary winding 269 of transformer 249. The relative gain of the amplifiers 246 and 257 is adjusted to make the voltage in the winding 268 0.866 times the voltage in winding 269 and one terminal of winding 268 is connected to the center tap of the winding 269. The three remaining free terminals of the two secondary windings 268, 269 now provide a three phase energy source at the third harmonic of the difference frequency between the carriers in antennas 11 and 12 and are attached to the delta connected windings 270, 271, 272 of the phase meter 25 in the usual manner. The resulting magnetic field reacts on the currents flowing in the rotatable winding 230 driving it to an angular position determined by the relative phase between the currents fed to winding 230 and those fed to the three delta connected phase meter windings. A pointer 273 is linked to the frame carrying the winding 230 by the shaft 274 and provides a numerical indication of the phase angle by rotation over the adjacent scale 275 which may be calibrated in degrees.

The apparatus of Figure 8 is carried on the mobile vehicle and responds to the radiations from the antennas 11 and 12 of Figure 7 in the following manner, neglecting the effect of terms which cancel in the final result:

Two alternating currents of different frequencies are produced in the amplifier and detector 196, one having the form cos $3\Omega t$, and the other having the form $$\cos\left(\Omega t+\frac{2\pi(d_1-d_2)}{\lambda}\right)$$

or, optionally, $$\cos\left(\Omega t+\frac{4\pi\omega\ \sin\theta}{\lambda}\right)$$

the first of which, it is seen, corresponds to the output from receiver 21 in Figure 1 with a multiplying factor of three substituted for "*n*." This is necessitated by the presence of the frequency tripler in the apparatus of Figure 7, which impresses amplitude modulation at the third harmonic of the difference frequency on the carrier radiated from antenna 11. The second current is seen to have a frequency equal to the beat frequency and to have a phase angle which is a function of the bearing of the mobile vehicle carrying the apparatus of Figure 8 from the radio beacon location. The current of form cos $3\Omega t$ is selected in transformer 202, amplified in amplifiers 233, 246 and 257, split in phase and recombined to provide a three phase reference source for the excitation of the phase meter 25. At the same time, the current of form $$\cos\left(\Omega t+\frac{4\pi\omega\ \sin\theta}{\lambda}\right)$$

is selected in transformer 199, amplified in tube 205, trebled in frequency in the multiplier tube 217 and applied to the rotor winding 230 of the phase meter 25. The current applied to the rotor winding 230 thus has the form $$\cos\left(3\Omega t+\frac{12\pi\omega\ \sin\theta}{\lambda}\right)$$

which is seen to correspond to the current in the lead 24 of Figure 1 with a multiplying factor of three substituted for "*n*." The phase meter inputs with this system are thus seen to correspond precisely to those obtained in the apparatus of Figure 1, while the spectrum space required has been materially reduced by the elimination of the carrier frequency radiated from the antenna 17 in Figure 1. The visible operation of the phase meter is the same in either system and the same mathematical expressions give the relations between the bearing of the receiving apparatus from the beacon and the readings obtained on the phase meter. A total antenna spacing of ten wavelengths in conjunction with the above mentioned multiplication factor of three provides a course definition of plus or minus 88 feet at 100 miles, in accordance with the earlier derived figures.

For the purposes of simplification in the explanation of the invention, the residual phase shift terms possibly introduced by some of the components, as by the leakage inductance of the transformers, have been neglected, as it is well known to introduce phase correctors in the apparatus for the elimination of such effects. Further, if it be desired to exert fine control over the positioning of the space pattern of zero phase indication lines, not only may the position of antenna 72 be made adjustable as previously mentioned, but this may also be accomplished without the movement of antenna 72, which may prove to be inconvenient by the introduction of a phase shifter between the demodulator and amplifier 14 and modulating stage 15 in Figure 1, or between the demodulator 32 and filter 33 of Figure 6.

It will be obvious that many changes and modifications may be made in the invention without departing from the spirit thereof as expressed in the foregoing description and in the appended claims.

What is claimed is:

1. In a radio beacon system, means for radiating wave energies of different frequencies from a plurality of spaced radiators, said energies differing in frequency by a predetermined frequency, and means jointly responsive to said radiated wave energies for radiating wave energy modulated by a harmonic of said difference frequency.

2. In a radio beacon system, an antenna, a source of electrical energy having a predetermined frequency connected to said antenna, a second antenna spaced from said first antenna, a source of electrical energy having another predetermined frequency connected to said second antenna, and means for modulating the energy of said second source in response to electrical energy having a frequency substantially equal to the difference between said first mentioned frequency and said second mentioned frequency.

3. In a radio beacon system, an antenna, a source of electrical energy having a predetermined frequency connected to said antenna, a second antenna spaced from said first antenna, a source of electrical energy having another predetermined frequency connected to said second antenna, means jointly responsive to the radiation from said antennae for deriving beat frequency energy, and means responsive to said beat frequency energy for modulating the energy of said second source.

4. In a radio beacon system, an antenna, a source of electrical energy having a predetermined frequency connected to said antenna, a second antenna spaced from said first antenna, a source of electrical energy having another predetermined frequency connected to said second antenna, means jointly responsive to energy from said sources for deriving beat frequency energy, and means responsive to said beat frequency energy for modulating the energy of said second source.

5. In a radio beacon system, an antenna, a source of electrical energy having a predetermined frequency connected to said antenna, a second antenna spaced from said first antenna, a source of electrical energy having another predetermined frequency connected to said second antenna, means jointly responsive to energy from said sources for deriving beat frequency energy, and means for modulating the energy of said second source at a harmonic of said beat frequency.

6. In a radio beacon system, an antenna, a source of periodic electrical energy connected to said antenna, a second antenna spaced from said first antenna, a second source of periodic electrical energy connected to said second antenna, and means jointly responsive to the radiation of said antennas for maintaining a substantially constant difference between the frequencies of said sources.

7. In a radio beacon system, an antenna, a source of periodic electrical energy connected to said antenna, a second antenna spaced from said first antenna, a second source of periodic electrical energy connected to said second antenna, means jointly responsive to the radiation of said antennas for maintaining a substantially constant difference between the frequencies of said sources, and means for modulating one of said sources at said difference frequency.

8. In a radio beacon system, an antenna, a source of periodic electrical energy connected to said antenna, a second antenna spaced from said first antenna, a second source of periodic electrical energy connected to said second antenna, means jointly responsive to the radiations of said antennae for deriving beat frequency energy, means responsive to said beat frequency energy for maintaining a substantially constant difference between the frequencies of said sources, and means responsive to said beat frequency energy for modulating the energy of one of said sources.

9. In a radio beacon system, an antenna, a source of periodic electrical energy connected to said antenna, a second antenna spaced from said first antenna, a second source of periodic electrical energy connected to said second antenna, means jointly responsive to the radiations of said antennae for deriving beat frequency energy means responsive to said beat frequency energy for maintaining a substantially constant difference between the frequencies of said sources, and means for modulating the energy of one of said sources at a harmonic of said beat frequency.

10. In a radio beacon system, an antenna, a source of periodic electrical energy connected to said antenna, a second antenna spaced from said first antenna, a second source of periodic electrical energy connected to said second antenna, a third antenna located on the perpendicular bisector of a line passing through said first and second antennas in the radiation fields of said antennas, means for deriving beat frequency energy connected to said third antenna, and means responsive to said beat frequency energy for modulating the energy of one of said sources.

11. In a radio beacon system, an antenna, a source of periodic electrical energy connected to said antenna, a second antenna spaced from said first antenna, a second source of perioric electrical energy connected to said second antenna, a third antenna located on the perpendicular bisector of a line passing through said first and second antennas in the radiation fields of said antennas, means for deriving beat frequency energy connected to said third antenna, and means for modulating the energy of one of said sources at a harmonic of said beat frequency.

12. In a radio position determining system, an antenna, a source of electrical energy having a predetermined frequency connected to said antenna, a second antenna spaced from said first antenna, a source of electrical energy having another predetermined frequency connected to said second antenna, and means for modulating the energy radiated from one of said antennas in response to electrical energy having a frequency substantially equal to the difference between said first mentioned frequency and said second mentioned frequency.

13. In a radio position determining system, an antenna, a source of electrical energy having a predetermined frequency connected to said antenna, a second antenna spaced from said first antenna, a source of electrical energy having another predetermined frequency connected to said second antenna, means jointly responsive to the radiation from said antennas for deriving beat frequency energy, and means responsive to said beat frequency energy for modulating the energy radiated from one of said antennas.

14. In a radio position determining system, an antenna, a source of electrical energy having a predetermined frequency connected to said antenna, a second antenna spaced from said first antenna, a source of electrical energy having another predetermined frequency connected to said second antenna, means jointly responsive to energy from said sources for deriving beat frequency energy, and means responsive to said beat frequency energy for modulating the energy radiated from one of said antennas.

15. In a radio position determining system, an antenna, a transmitter for delivering electrical energy to said antenna, a second antenna spaced from said first antenna, a second transmitter for delivering electrical energy to said second antenna, said transmitters respectively including wave signal generators having different output frequencies, means jointly responsive to waves derived from said generators for developing a beat frequency signal having a frequency equaling the difference between said output frequencies and means responsive to said beat frequency signal for modulating the energy radiated from one of said antennas.

SEISMOGRAPH SERVICE CORPORATION,
*Assignee of Mary M. Brunner, Administratrix of Estate of Reed R. Brunner, Deceased,*
By JAMES E. HAWKINS,
*Vice President.*

REFERENCES CITED

The following references are of record in the file of this patent:

UNITED STATES PATENTS

| Number | Name | Date |
|---|---|---|
| 1,995,285 | Albershiem et al. | Mar. 26, 1935 |
| 2,133,303 | Mirick | Oct. 18, 1938 |
| 2,144,203 | Shankin | Jan. 17, 1939 |
| 2,148,267 | Honore | Feb. 21, 1939 |
| 2,394,157 | Earp | Feb. 5, 1946 |